United States Patent
Franc et al.

(10) Patent No.: US 10,946,786 B2
(45) Date of Patent: Mar. 16, 2021

(54) DEVICE COMBINING STOP LAMPS AND CARGO LAMPS

(71) Applicant: VALEO VISION BELGIQUE, Meslin l'Eveque (BE)

(72) Inventors: Alexandre Franc, Meslin l'Eveque (BE); Arthur-Guillaume Renaudeau, Meslin l'Eveque (BE); Yves Dubois, Meslin l'Eveque (BE)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 0 days.

(21) Appl. No.: 16/366,545

(22) Filed: Mar. 27, 2019

(65) Prior Publication Data

US 2019/0299842 A1 Oct. 3, 2019

(30) Foreign Application Priority Data

Mar. 27, 2018 (FR) ...................... 1852656

(51) Int. Cl.
| | | |
|---|---|---|
| *B60Q 1/00* | (2006.01) | |
| *F21S 43/20* | (2018.01) | |
| *B60Q 3/60* | (2017.01) | |
| *B60Q 1/44* | (2006.01) | |
| *B60Q 3/30* | (2017.01) | |

(Continued)

(52) U.S. Cl.
CPC ............. *B60Q 1/0017* (2013.01); *B60Q 1/30* (2013.01); *B60Q 1/302* (2013.01); *B60Q 1/44* (2013.01);

(Continued)

(58) Field of Classification Search
CPC .......... B60Q 1/0017; B60Q 3/30; B60Q 3/60; B60Q 1/30; B60Q 1/302; B60Q 1/44;

(Continued)

(56) References Cited

U.S. PATENT DOCUMENTS

2005/0047157 A1 3/2005 Reiss
2010/0149826 A1 6/2010 Leese et al.

(Continued)

FOREIGN PATENT DOCUMENTS

DE 296 02 125 U1 5/1996
EP 1 510 400 A2 3/2005

(Continued)

OTHER PUBLICATIONS

French Preliminary Search Report dated Nov. 14, 2018 in French Application 18 52656, filed on Mar. 27, 2018 (with English Translation of Categories of Cited Documents).

*Primary Examiner* — Rajarshi Chakraborty
*Assistant Examiner* — Hana S Featherly
(74) *Attorney, Agent, or Firm* — Oblon, McClelland, Maier & Neustadt, L.L.P.

(57) ABSTRACT

A lighting device for a motor vehicle, the lighting device including a vehicle stop-lamp assembly and a cargo-lamp assembly. The lighting device includes a common lens that is configured, on the one hand, to form at least one stop-lamp light beam and, on the other hand, to form at least one cargo-lamp light beam. It furthermore includes a first group of light sources that are configured to emit stop-lamp light beams and a second group of light sources that are configured to emit cargo-lamp light beams, the light sources of the first group and of the second group being arranged on a common electronic holder.

16 Claims, 6 Drawing Sheets

Figure 1:
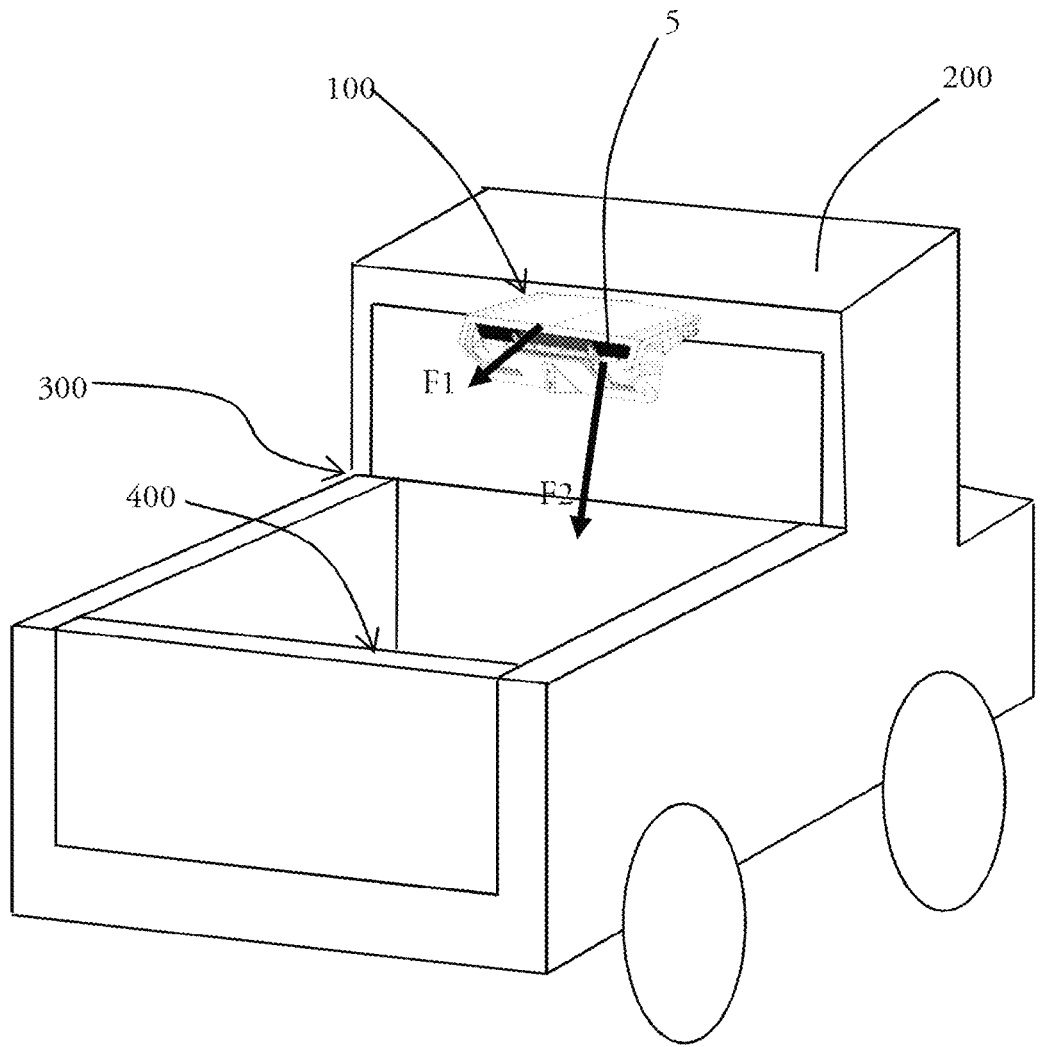
Figure 1:
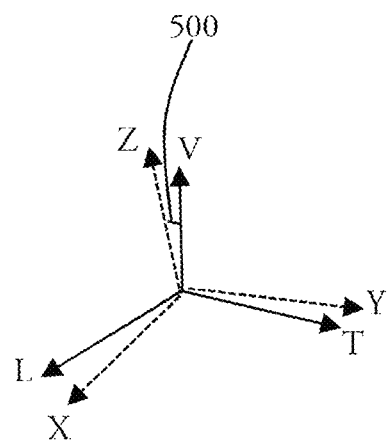

(51) Int. Cl.
*F21S 43/27* (2018.01)
*F21S 41/151* (2018.01)
*F21S 41/19* (2018.01)
*B60Q 1/30* (2006.01)
*F21S 41/143* (2018.01)
*F21S 41/26* (2018.01)
*F21S 43/15* (2018.01)
*F21S 43/19* (2018.01)

(52) U.S. Cl.
CPC ............... *B60Q 3/30* (2017.02); *B60Q 3/60* (2017.02); *F21S 41/143* (2018.01); *F21S 41/151* (2018.01); *F21S 41/192* (2018.01); *F21S 41/26* (2018.01); *F21S 43/15* (2018.01); *F21S 43/195* (2018.01); *F21S 43/26* (2018.01); *F21S 43/27* (2018.01)

(58) Field of Classification Search
CPC .......... F21S 41/26; F21S 43/27; F21S 41/143; F21S 41/192; F21S 41/151; F21S 43/15; F21S 43/195; F21S 43/26

USPC ........................................................ 362/509
See application file for complete search history.

(56) References Cited

U.S. PATENT DOCUMENTS

| | | | |
|---|---|---|---|
| 2012/0257407 A1* | 10/2012 | Demma | B60R 13/04 362/602 |
| 2014/0111741 A1* | 4/2014 | Han | G02B 5/0257 349/62 |
| 2016/0200241 A1* | 7/2016 | Snider | B60Q 1/268 296/146.16 |
| 2017/0313244 A1 | 11/2017 | Luciew | |

FOREIGN PATENT DOCUMENTS

| | | |
|---|---|---|
| FR | 2 727 742 A1 | 6/1996 |
| FR | 2 765 166 A1 | 12/1998 |
| FR | 2 794 218 A1 | 12/2000 |
| WO | WO 2017/10326 | 6/2017 |

* cited by examiner

DEVICE COMBINING STOP LAMPS AND CARGO LAMPS

The field of the present invention is that of the lighting of motor vehicles. The present invention more precisely relates to lighting devices intended for vehicles comprising, in the rear portion thereof, an exterior transporting zone, for example intended for the transport of cargo, and more particularly relates to a lighting device combining at least one set of stop lamps intended to draw attention to the vehicle during specific manoeuvres and a set of cargo lamps intended to illuminate the aforementioned rear exterior transporting zone. The invention is particularly advantageously but not exclusively applicable to the type of vehicle known as pickup trucks.

It is known to install, for example behind a cab of a vehicle comprising a rear exterior zone for transporting cargo, stop lamps (then known as CHMLs for central high-mounted stop lamps) and cargo lights. These two types of light must however meet different and sometimes contradictory technical specifications.

Specifically, stop lamps, which are intended to draw the attention of other road users to the vehicle and/or one of its manoeuvres, must be visible from the largest possible distance measured substantially in the direction of the road: this implies the use of one or more light beams that are, on the one hand, directed substantially in the longitudinal direction of the vehicle, i.e. the direction of movement of the latter, and that are, on the other hand, oriented as parallel as possible to the surface of the road over which the vehicle is moving. For these reasons, it is known to place such stop lights behind a cab of such a vehicle, preferably in a position that is central on this cab and in the upper portion of the latter in order to obtain a maximum visibility.

In contrast, cargo lamps must deliver, to the rear exterior transporting zone of the vehicle, powerful lighting that covers as much of the area of this transporting zone as possible, in order to allow, for example, a good visibility during the loading of cargo, or as complete an inspection as possible of the transporting zone, once the cargo has been installed in the latter. For these reasons, since the rear exterior transporting zone is preferably located below a cab of the vehicle in the vertical direction of the latter, the light beams intended for the cargo lamps are preferably directed, in the vertical direction of the vehicle, downward, and are preferably oriented so that the one or more light beams that they emit reach, as far as possible, all the nooks of the transporting volume.

In order in particular to meet these various orientation requirements, it is known to install, in the rear upper portion of a cab of a vehicle comprising a rear exterior transporting zone, stop lamps in a central position in the transverse direction of the vehicle, and, on either side of these stop lamps in the transverse direction of the vehicle, cargo lamps. It will be recalled that the longitudinal direction of the vehicle is here the main direction of extension of the latter, which is also the main direction in which this vehicle moves over the road. The transverse direction of the vehicle, which is substantially perpendicular to the aforementioned longitudinal direction, defines, with the latter, a plane that is substantially parallel to that of the road on which the vehicle is found, and the vertical direction of the vehicle is the direction perpendicular to the longitudinal direction and to the transverse direction of the vehicle defining, with said transverse and longitudinal directions, an orthonormal coordinate system.

It is also known to install CHMSLs and cargo lights in a single casing, in order to decrease the number of components of the lighting assembly thus produced. However, in this case the optical elements respectively dedicated to the stop lamps and to the cargo lamps are separate. In particular, the light sources employed for each type of lamp have different characteristics, and the lenses for forming the various beams have different profiles and dimensions in order to allow beams having different specificities to be formed. Moreover, because of the disparity in the optical specifications of the stop lamps and of the cargo lamps, the optical elements respectively dedicated to these functions are generally preassembled by type of function/of lamp, before being placed in a common casing. Lastly, regulatory constraints require the stop lamps and the cargo lamps to be independently driveable: for example, the cargo lamps will have to be turned off as soon as the vehicle starts moving. The devices for controlling and driving the various lamps are therefore separate, and most often require separate interconnects and circuits.

In a cost-reduction context, the aim of the invention is to provide a lighting device comprising both stop lamps and cargo lamps, that is simpler, less expensive to manufacture and that requires a smaller number of assembly operations than known prior-art devices, while guaranteeing an optimal lighting performance.

To this end, one subject of the invention is a lighting device for a motor vehicle, said lighting device comprising a vehicle stop-lamp assembly and a vehicle cargo-lamp assembly, characterized in that the lighting device comprises a common lens that is configured to form, on the one hand, at least one stop-lamp light beam, and to form, on the other hand, at least one cargo-lamp light beam.

According to the invention, the lighting device comprises a common casing in which a plurality of light sources, preferably light-emitting diodes (LEDs), are housed. Within this common casing, the light sources are arranged in a direction that is referred to, below, as the transverse direction of the lighting device according to the invention. Advantageously, the invention makes provision for the light sources to have characteristics, for example in terms of colour and/or emitted light intensity, that are different depending on whether they are intended to emit light beams dedicated to the stop lamps or to emit light beams intended for the cargo lamps.

In the lighting device according to the invention, each light source is advantageously associated with a collimator that is configured to form, from the light beam emitted by this source, a light beam the rays of which are parallel to one another. The light output by each light source is, after having passed through the associated collimator, conveyed to the aforementioned common lens, then passes through the latter. The direction of propagation of the light between each emitting source and the collimator that is associated therewith, then between each collimator and the common lens, will, below, be referred to as the longitudinal direction of the lighting device according to the invention. This direction is the direction of the optical axis of an elementary optical unit formed by the light source in question, the collimator that is associated therewith, and the region of the common lens passed through by the light beam emitted by the source in question. Advantageously, the optical axes of the elementary optical units are all, in the lighting device according to the invention, substantially parallel to one another, and the aforementioned longitudinal direction is the direction of these optical axes.

The common lens extends in a main direction of elongation that is substantially parallel, to within manufacturing tolerances, to the transverse direction of the lighting device according to the invention, i.e. to the direction in which the light sources of the lighting device are arranged. Advantageously, moreover, within the lighting device according to the invention, the distance, measured in the longitudinal direction of the lighting device according to the invention, between a light source of this device and the common lens, is substantially equal to a focal length of the common lens in the portion thereof passed through by the light beam emitted by the source in question. In other words, each light source is, in the elementary optical unit that it forms with the collimator that is associated therewith and with the portion of the common lens passed through by the light beam that it emits, located substantially at the focal point of the portion of the common lens passed through by the light beam output by this light source.

According to one feature of the invention, an internal surface of the common lens comprises a set of complex shapes that are configured to form, in a first region of the common lens, at least one stop-lamp light beam and to form, in a second region of the common lens, at least one cargolamp light beam. The expression "internal surface of the common lens" is here understood to mean the surface of the latter which is turned toward the side of the light sources.

In other words, according to the invention, the common lens has a geometric configuration that makes it possible to form, in at least one first region of this common lens, at least one light beam configured depending on the specifications of the stop lamps, and that makes it possible to form, in at least one second region of this common lens, at least one light beam configured depending on the specifications of the cargo lamps.

According to a first embodiment of the invention, the first region of the common lens is located in a substantially central position of the latter in the transverse direction of the lighting device, and the second region of the common lens comprises a first portion and a second portion that are located on either side, in the transverse direction of the lighting device, of the first region of the common lens. According to an alternative embodiment of the invention, the first region and the second region of the common lens are substantially superposed in the vertical direction of the lighting device according to the invention.

According to one particularly advantageous but nonlimiting embodiment of the invention, the aforementioned complex shapes are substantially prismatic and each extend, in the longitudinal direction of the lighting device, so as to protrude from the internal surface of the common lens. More precisely, each of these prismatic shapes advantageously extends between the internal surface of the common lens and an apex ridge extending substantially in the vertical direction of the lighting device according to the invention. Even more precisely, these prismatic shapes are of triangular base, i.e., with reference to the directions and orientations defined above, the cross section of each of these prismatic shapes in a plane parallel to the transverse and longitudinal directions of the lighting device according to the invention forms a triangle the base of which extends along the internal surface of the common lens, i.e. mainly substantially in the transverse direction of the lighting device, and the height of which, measured perpendicularly to the base from the apex formed by the intersection of the apex ridge with the aforementioned plane, is directed toward a light source and its associated collimator. In simpler terms, the invention makes provision for the apex ridge of each prismatic shape to be, in the longitudinal direction of the lighting device, oriented toward a light source.

According to the invention, the aforementioned prismatic shapes are arranged side-by-side in the transverse direction of the lighting device according to the invention, such that the internal surface of the common lens has a succession of prismatic shapes such as mentioned above, arranged side-by-side substantially over the entirety of the dimension of the internal surface of the common lens in the transverse direction of the latter and of the lighting device according to the invention.

As a result of the above, according to the invention, these prismatic shapes are arranged, facing each of the light sources, so as to form systems of so-called Fresnel lenses. More precisely, within each elementary optical unit, the light beam emitted by the light source of this elementary optical unit is conveyed toward a group of prismatic shapes that together form an elementary Fresnel lens for the light source in question. The common lens of the lighting device according to the present invention thus has, on its internal surface, a succession of elementary Fresnel lenses that are arranged side-by-side in the transverse direction of the lighting device according to the invention.

Such an arrangement, apart from the decrease in bulk that is made possible, in particular in the longitudinal direction of the lighting device according to the invention, for the common lens and the lighting device in its entirety, furthermore allows, via geometric conformations specifically defined for each precedingly defined elementary Fresnel lens, the shape of each light beam emitted by each light source to be adjusted depending on whether the light beam is intended for the stop lamps or for the cargo lamps. By way of nonlimiting example, the dimension of the prismatic shapes in the longitudinal direction of the lighting device according to the invention will possibly be larger in the first region of the common lens, which is configured to form at least one light beam intended for the stop lamps, than in the second region of this common lens, which is configured to form at least one light beam intended for the cargo lamps.

The invention thus allows, by means of a single, common lens various light beams to be formed the characteristics of which meet the different particular requirements of stop lamps or cargo lamps. The invention thus achieves one of its aims, by providing a simple system comprising a single optical lens allowing at least two different types of light beams intended for different lighting functions to be obtained.

Advantageously, the invention may have one or more of the following features, which may be implemented alone or in combination:

an external surface of the common lens comprises a first set of diffracting optical elements that are configured to orient, in a first region of the common lens, at least one stop-lamp light beam, and a second set of diffracting optical elements that are configured to orient, in a second region of the common lens, at least one cargolamp light beam. More precisely, the diffracting elements of the first set are defined in order to direct the one or more light beams passing through the first region of the common lens, depending on the directional and orientational requirements of the stop lamps, and the diffracting elements of the second set are defined in order to direct the one or more light beams passing through the second region of the common lens, depending on the directional and orientational requirements of the cargo lamps. The expression "external surface of the common lens" is here understood to mean the surface thereof opposite, in the longitudinal direction of the lighting device according to the invention, to its internal surface as defined above, i.e. the surface of the common lens located opposite the light sources in the longitudinal direction of the lighting device according to the invention. In other words, in the longitudinal direction of the lighting device according to the invention, the Fresnel system, described above, formed by the set of elementary Fresnel lenses each associated with a light source, is located between the external surface of the common lens and the light sources.

the various diffracting optical elements extend so that the elements of the first set of diffracting optical elements are arranged in a direction perpendicular to the direction in which the elements of the second set of diffracting optical elements extend.

each element of the first set of diffracting optical elements extends substantially parallel to the transverse direction of the lighting device according to the invention, and is configured to deviate the one or more light beams coming from the first region of the common lens in the vertical direction of the lighting device according to the invention. Advantageously, the various elements of the first set of diffracting optical elements are arranged side-by-side, substantially parallel to one another, to within manufacturing tolerances, in the vertical direction of the lighting device according to the invention, in such a way that they occupy substantially the entirety of the first region of the common lens in the vertical direction of the lighting device according to the invention.

each of the elements of the first set of diffracting optical elements is a prism arranged to protrude, in the longitudinal direction of the lighting device, from the external surface of the common lens, and the apex ridge of which, which is directed away from the light sources in the longitudinal direction of the lighting device, extends substantially over the entirety of the dimension of the first region of the common lens in the transverse direction thereof.

each element of the first set of diffracting optical elements is a groove directed in the transverse direction of the lighting device according to the invention, extending substantially, to within manufacturing tolerances, over the entirety of the dimension of the common lens in this transverse direction, and arranged recessed, in the longitudinal direction, into the thickness of the common lens, from the external surface of the latter.

each element of the second set of diffracting optical elements extends substantially parallel to the vertical direction of the lighting device, and is configured to deviate the one or more light beams coming from the second region of the common lens in the transverse direction of the lighting device. Advantageously, the various elements of the second set of diffracting elements are arranged side-by-side, substantially parallel to one another, to within manufacturing tolerances, in the transverse direction of the lighting device according to the invention, in such a way that they occupy substantially the entirety of the second region of the common lens in said transverse direction of the lighting device.

each of the elements of the second set of diffracting optical elements is a prism arranged to protrude, in the longitudinal direction of the lighting device, from the external surface of the common lens, and the apex ridge of which, which is directed away from the light sources in the aforementioned longitudinal direction, extends substantially over the entirety of the dimension of the first region of the common lens in the vertical direction thereof.

each element of the second set of diffracting optical elements is a groove directed in the vertical direction of the lighting device, extending over the entirety of the dimension of the common lens in this vertical direction, and arranged recessed, in the longitudinal direction, into the thickness of the common lens, from the external surface of the latter.

the common lens is produced by injection moulding, in a mould, of a plastic chosen for its mechanical and optical properties; the plastic may in particular be overmoulded onto a frame for holding the common lens and also for holding additional optical elements.

a first group of light sources that are configured to emit stop-lamp light beams, and a second group of light sources that are configured to emit cargo-lamp light beams, are arranged on a common electronic holder. This allows the number of components of the lighting device according to the invention to be further decreased and assembly thereof to be facilitated. Moreover, the common electronic holder also allows the number of elements for connecting the light sources to be decreased, thus decreasing both assembly time and the risk of error during assembly. Advantageously, the light sources are organized, on the common electronic holder, in a first group of light sources, which are intended for the stop lamps, and which are arranged, in the longitudinal direction of the lighting device according to the invention, facing the first region of the common lens, and into a second group of light sources, which are intended for the cargo lamps, and which are arranged in the longitudinal direction of the lighting device according to the invention, facing the second region of the common lens.

the common electronic holder is arranged substantially parallel to the common lens, and more particularly to the plane in which the common lens mainly extends within the lighting device according to the invention.

the common electronic holder comprises at least one housing configured to receive, by snap fastening, at least one finger that is securely fastened to the common lens. In various embodiments of the invention, the aforementioned fingers may be arranged directly on the common lens or on a frame to which the latter is attached within the lighting device according to the invention. In this case, the aforementioned frame is advantageously also securely fastened to the collimators associated with each light source of the lighting device according to the invention. Advantageously, the invention makes provision for the common electronic holder to comprise a plurality of housings distributed along the transverse direction of the lighting device according to the invention, each housing being configured to receive by snap fastening one finger that is securely fastened to the common lens.

the lighting device according to the invention comprises at least one projecting lens an internal surface of which comprises a set of light-scattering elements. At least one surface of this projecting lens is advantageously arranged substantially parallel, in the transverse direction of the lighting device, to the common lens described above, in such a way that this common lens is located, in the longitudinal direction of the lighting device according to the invention, between the common electronic holder and the projecting lens. Similarly to the internal surface of the common lens, the internal surface of the projecting lens is here defined as the surface of the latter located, in the longitudinal direction of the lighting device according to the invention, on the side of the common electronic holder and of the light sources. The scattering elements are here defined in order to increase the uniformity of the light intensities of the various beams emitted by the lighting device according to the invention. Specifically, it follows from the above that the one or more light beams intended for the stop lamps are formed from the sum of the beams output by the light sources of the first group of light sources, and that the one or more light beams intended for the cargo lamps are formed from the sum of the beams output by the light sources of the second group of light sources. The aforementioned scattering elements advantageously allow these sums of elementary beams to be converted into illuminated areas that extend in the transverse and vertical directions of the lighting device according to the invention, thus improving both the aesthetics of the device and user comfort. According to one particularly advantageous, but non-limiting, embodiment of the invention, these light-scattering elements are, for example, rounded shapes arranged side-by-side, in the vertical direction of the lighting device, so as to protrude, in the longitudinal direction of the lighting device according to the invention, from the internal surface of the projecting lens, each rounded shape extending substantially over the entirety of the dimension, in the transverse direction of the lighting device, of the internal surface of the projecting lens.

The invention therefore achieves the first aim that was set therefor: by employing a common lens and where appropriate by employing a common electronic holder, it allows the number of components of a lighting device combining stop lamps and cargo lamps to be decreased.

The invention furthermore relates to a method for assembling a lighting device such as was just described, this method comprising at least one step of preassembling the common lens with the common holder by snap fastening fingers, configured in a frame for receiving the common lens, into corresponding housings in the common electronic holder of the light sources. By preassembling the optical unit formed, in particular, by the common electronic holder equipped with the light sources, the collimators and the common lens, the invention facilitates the assembly of the lighting device according to the invention, thus decreasing manufacturing costs and increasing the reliability of the assembly. The invention thus achieves another of the aims that were set therefor.

The invention lastly relates to a motor vehicle equipped with a lighting device such as described above, in which the lighting device is placed in such a way that its vertical direction makes, with the vertical direction of the vehicle, which direction was defined above, an angle substantially comprised between 10 and 45 degrees. It must be understood that here this angle is measured from the vertical direction of the vehicle, and that it corresponds to a downward inclination, i.e. an inclination in the direction of the road on which the vehicle is located, of the aforementioned lighting device. As a result of the above, the optical unit, formed in particular by the common electronic holder equipped with the light sources and by the elementary optical units that are associated with each light source, is, in such a vehicle, in its entirety also inclined downward, i.e. the beams emitted by the light sources are directed downward. The elements of the first set of diffracting optical elements arranged on the external surface of the common lens then deviate the one or more light beams of the stop lamps upward, in order to increase the distance at which the latter may be seen by vehicles being driven behind the vehicle according to the invention.

The inclination of the lighting device results from a compromise between the need to project a stop-lamp beam that will be visible from faraway by users of following vehicles and the need to project toward the zone for transporting cargo a cargo-lamp beam, and this inclined arrangement is accompanied by the presence of first optical elements allowing the stop-lamp beam to be rectified via a vertical deviation of this beam and the presence of second optical elements allowing the cargo-lamp beam to be exploded via a horizontal deviation of this beam.

Figure 2:
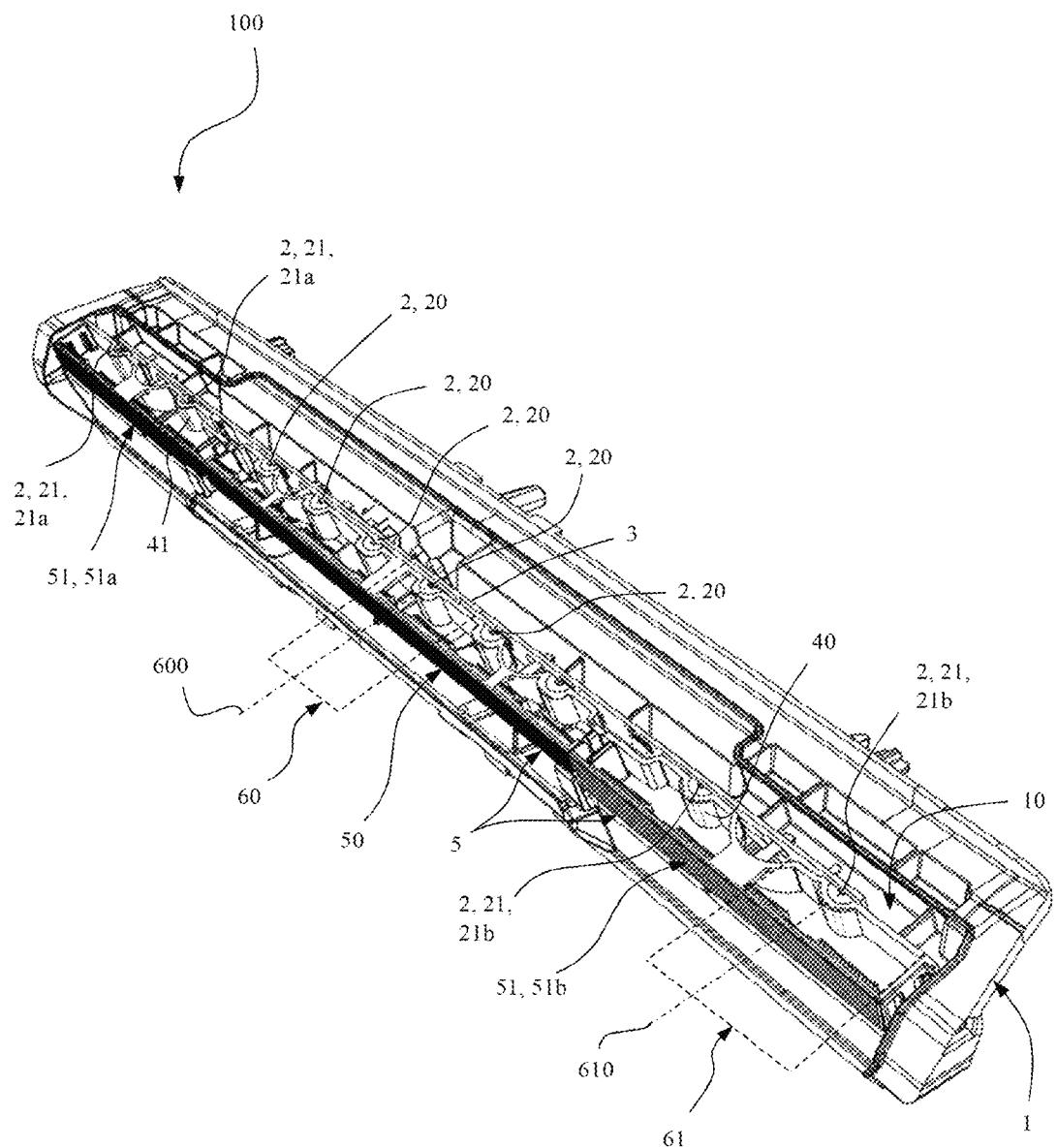
Figure 3:
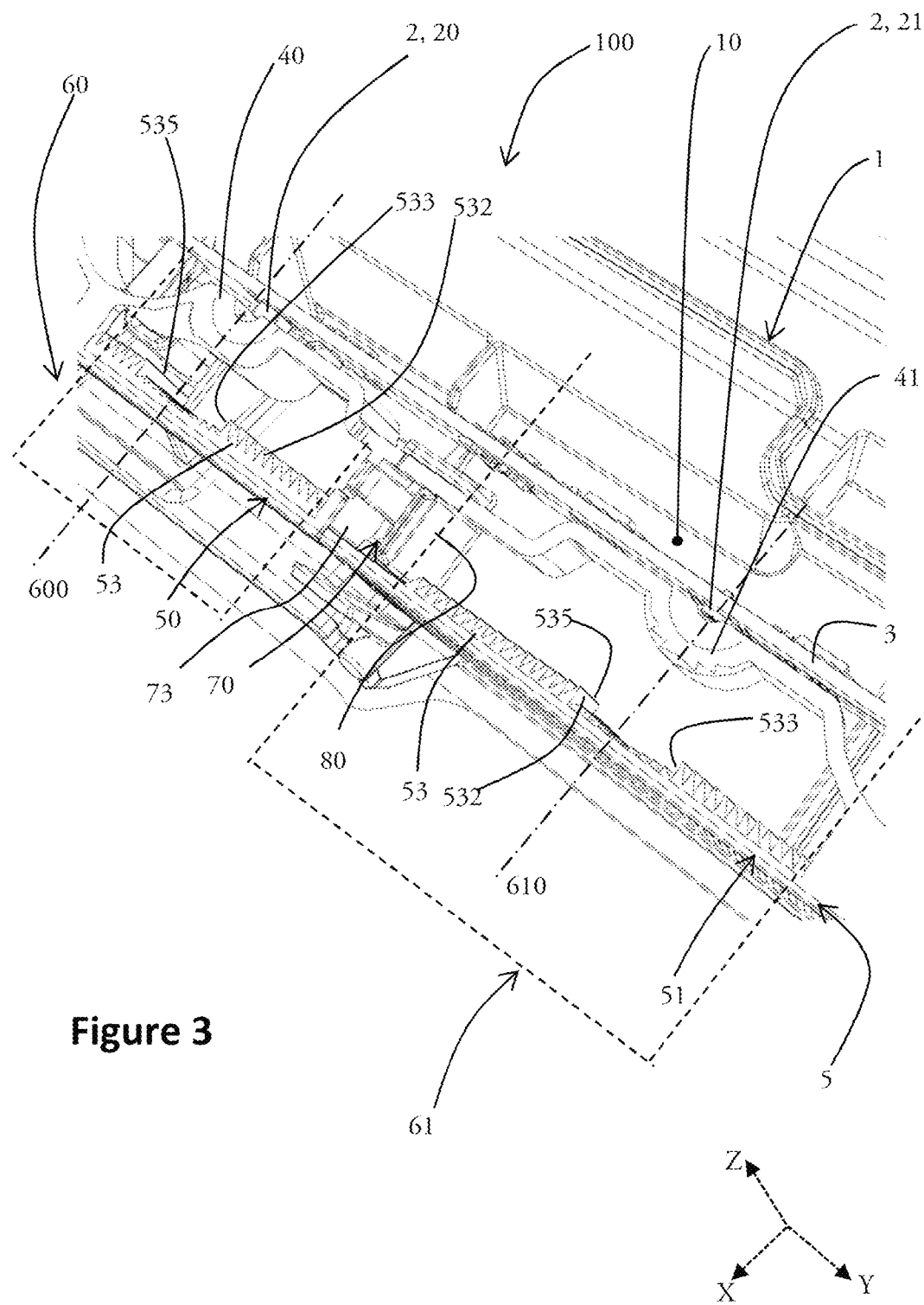
Figure 4:
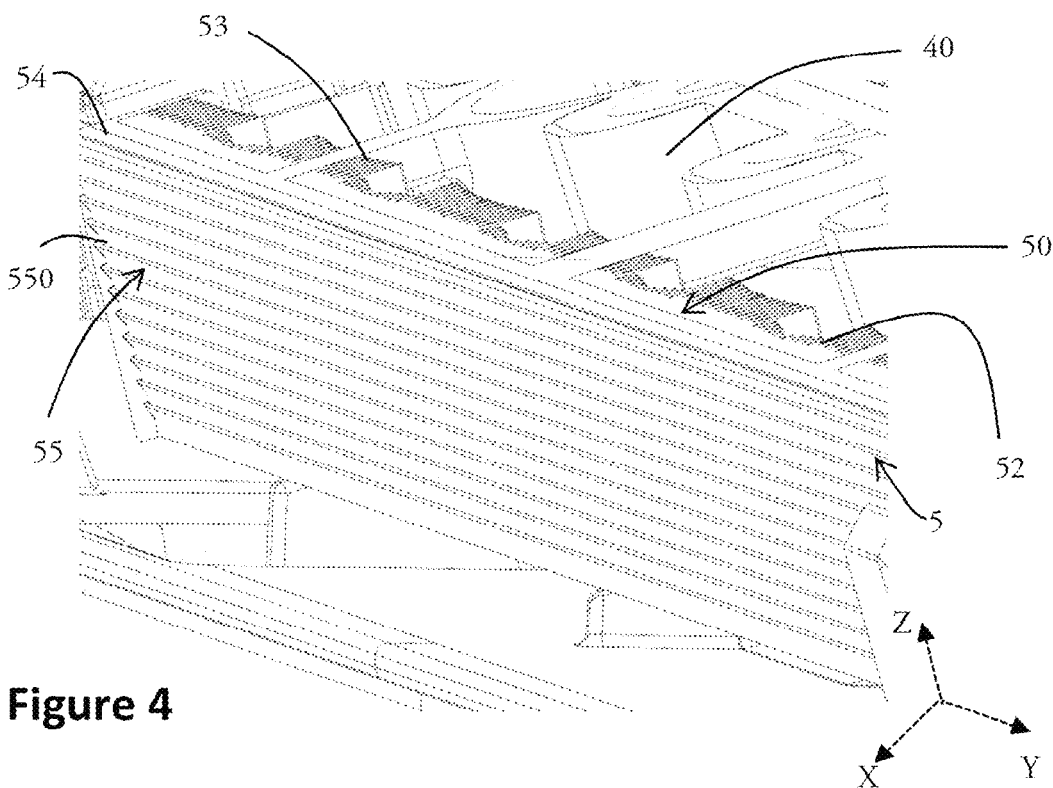
Figure 5:
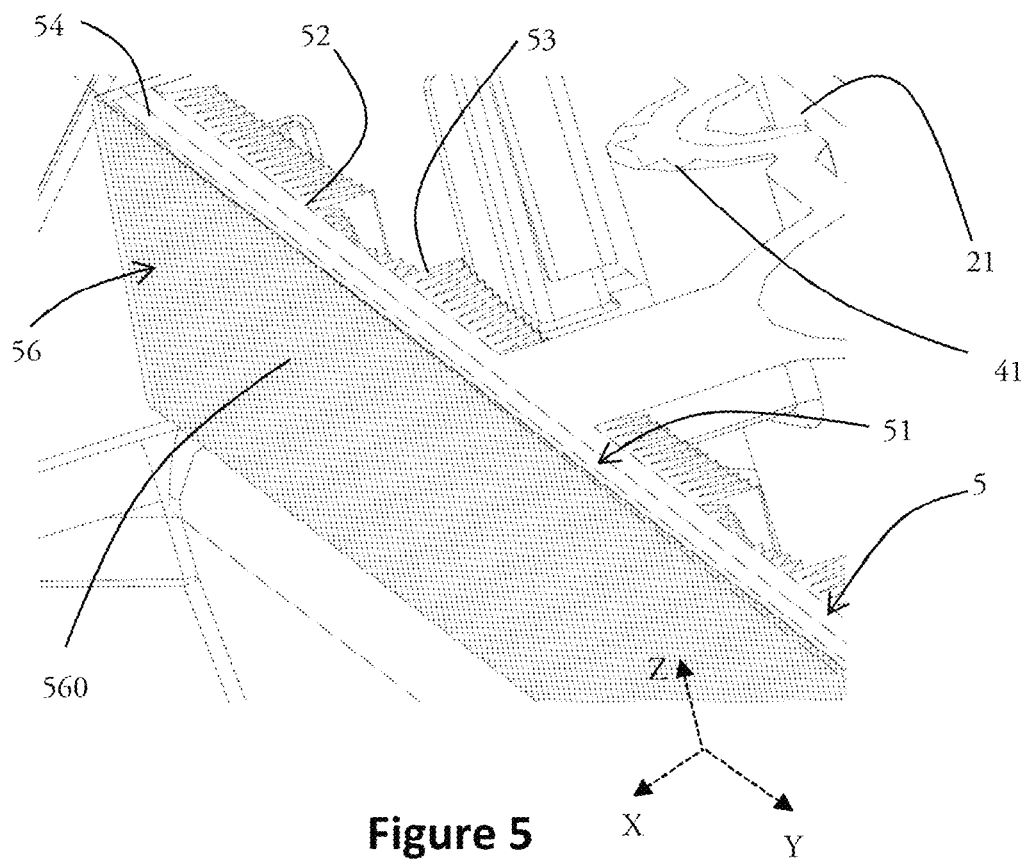
Figure 6:
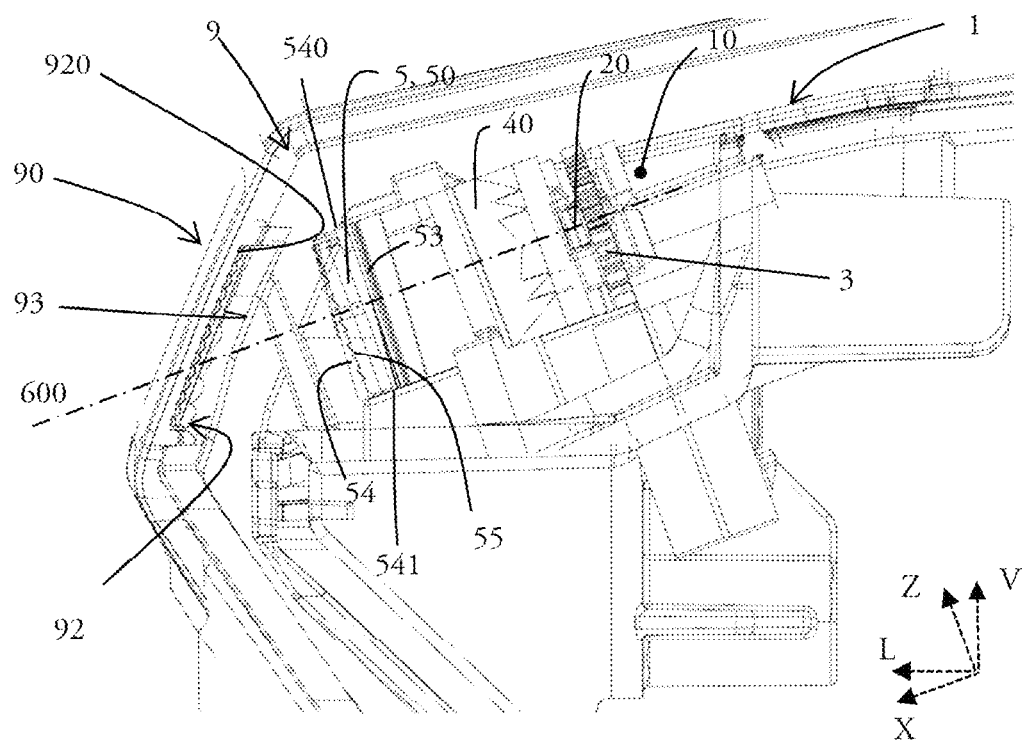
Figure 7:
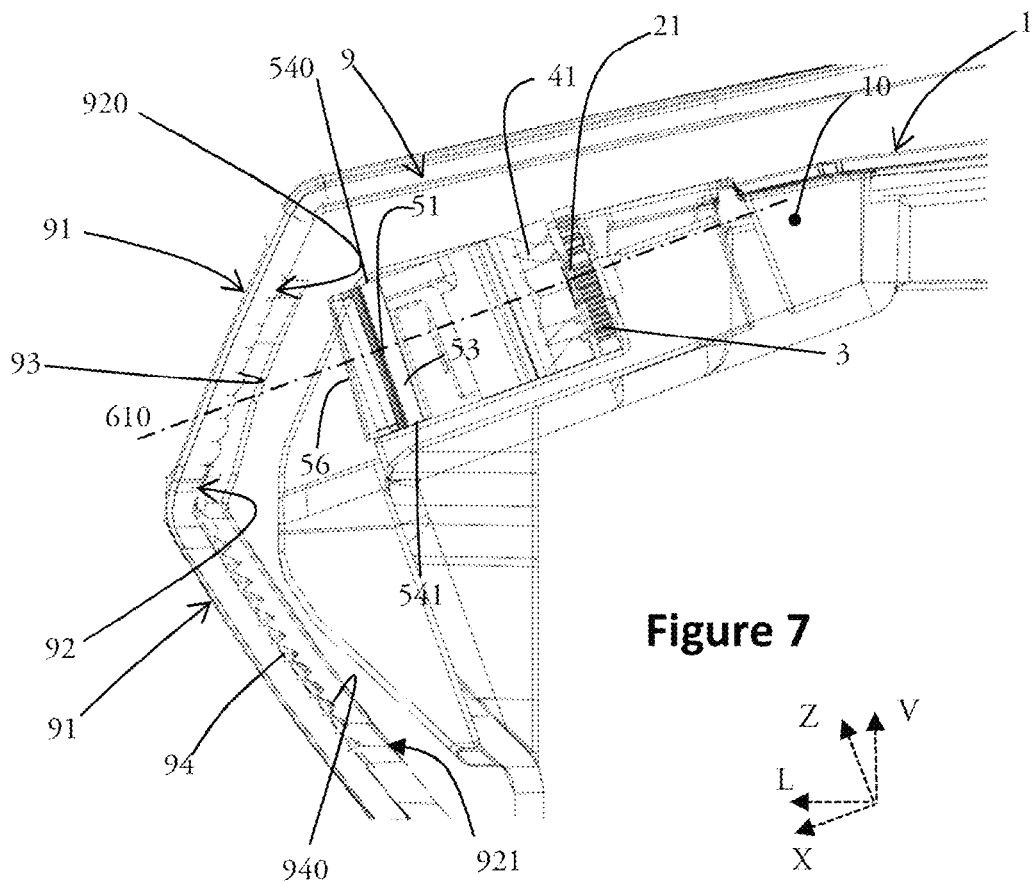
Figure 8:
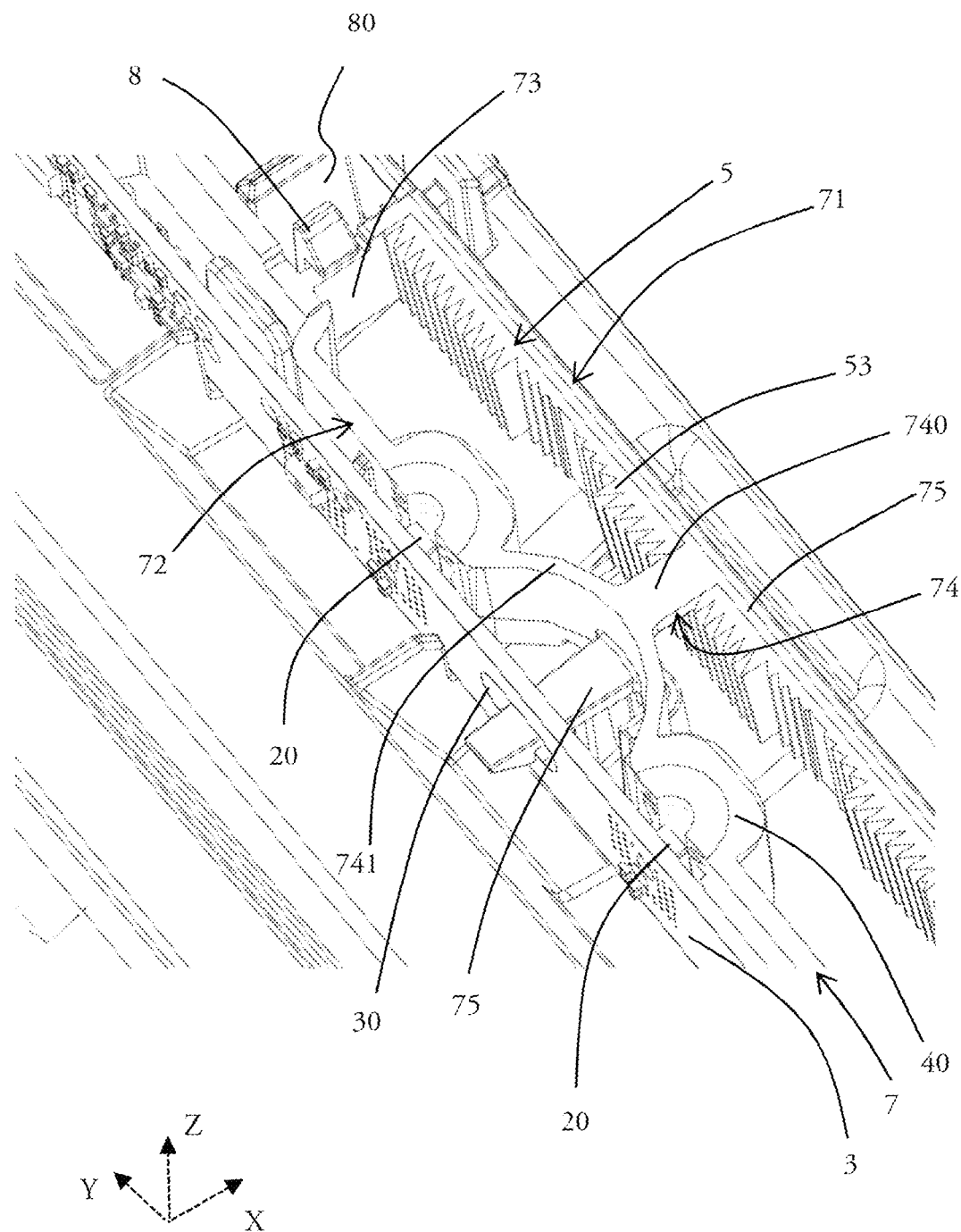

Other features, details and advantages of the invention will become more clearly apparent on reading the description given below by way of indication, with reference to the drawings, in which:

FIG. 1 is a schematic perspective view of a vehicle equipped with a lighting device according to the invention, FIG. 2 is a general schematic perspective view of one particular embodiment of a lighting device according to the invention, FIG. 3 is a schematic perspective view of a detail of the embodiment illustrated in FIG. 2, FIG. 4 is a close-up schematic perspective view of a detail of the external surface of the first region of the common lens, FIG. 5 is a close-up schematic perspective view of the external surface of the second region of the common lens, FIGS. 6 and 7 are schematic cross-sectional views, in a transverse vertical plane, of a lighting device according to the invention, in the first region and in the second region of the common lens, respectively, and FIG. 8 is a close-up schematic perspective view of a detail of the lighting device according to the invention, more particularly showing assembling elements thereof.

It will firstly be noted that although the figures illustrate the invention in detail with regard to implementation thereof, said figures may of course, where appropriate, be used to better define the invention. It will also be noted that elements that are the same have been referenced with the same references in all the figures.

With reference to FIG. 1, a lighting device 100 according to the invention is more particularly intended to be placed behind a cab 200 of a motor vehicle 300 comprising a rear exterior zone 400 for transporting, cargo for example. Such a vehicle may in particular take the form of a pick-up truck, in the context of which application the invention will preferentially be described below.

According to the invention, such a lighting device 100 combines, on the one hand, stop-lamp functions of the vehicle 300, i.e. functions for bringing the vehicle 300 to the attention of other vehicles located behind the vehicle 300 and, on the other hand, cargo-lamp functions, i.e. functions for lighting the rear exterior transporting zone 400.

As was mentioned above, for reasons of visibility, a stop-lamp light beam output by the lighting device 100 is advantageously oriented substantially in the longitudinal direction L of the vehicle 300, i.e. in the main direction in which the vehicle 300 moves over a road, in such a way that it may be seen by a vehicle located at the largest possible distance from the vehicle 300. To this end, such a beam will preferably be oriented in a direction illustrated by the arrow F1 in FIG. 1, i.e. substantially parallel to the longitudinal direction L of the vehicle 300.

It will be recalled that the vertical direction V of the vehicle 300 is defined as being the direction perpendicular to the longitudinal direction L and to a transverse direction T of the vehicle 300, the latter direction being perpendicular to the longitudinal direction L of the vehicle and defining therewith a plane that is substantially parallel to the plane of a road on which the vehicle 300 is found. The directions L, V and T thus defined together form an orthonormal coordinate system (L, V, T) of the vehicle. With reference to this coordinate system, the top of the vehicle 300 is defined as being the portion of the latter opposite, in the vertical direction V of the vehicle, to the portion via which the latter touches a road.

With reference to these various directions and orientations, a cargo-lamp light beam output by the lighting device 100 is advantageously emitted in a direction for example illustrated by the direction of the arrow F2 in FIG. 1. More precisely, such a cargo-lamp light beam is oriented to deliver optimal illumination of the rear exterior transporting zone 400 defined above: it is therefore advantageously directed substantially downward, in the vertical direction V of the vehicle 300, with respect to a direction F1 of a stop-lamp beam output by the lighting device 100. Moreover, the dispersion of such a cargo-lamp beam in the transverse direction T of the vehicle 300 may be larger than that of a stop-lamp beam, in order to deliver an optimal illumination in particular to the corners of the rear exterior loading zone 400.

It will be understood that to these different requirements with respect to the direction and orientation of the light beams output by the lighting device 100 and respectively intended for the "stop lamps" function and the "cargo lamps" function may be added requirements in terms of the colour and/or the light intensity of the beams respectively dedicated to these various functions.

To meet these various requirements, the invention provides a lighting device 100 such as schematically illustrated in FIGS. 2 to 8.

With reference to FIG. 2, a lighting device 100 according to the invention comprises a common casing 1 forming a cavity 10 in which a plurality of light sources 2 are placed. The light sources 2 are preferably light-emitting diodes (LEDs) and they are, according to the invention, all placed on a common electronic holder 3 placed in the cavity 10 of the common casing 1. On the common electronic holder 3, the light sources 2 are arranged in series in a main direction of arrangement referred to below as the transverse direction Y of the lighting device 100. As FIG. 2 shows, the aforementioned transverse direction Y is also the main direction of elongation of the common casing 1 and of the common electronic holder 3.

More precisely, the light sources 2 are organized into a first group of light sources 20 that are intended to deliver stop-lamp light beams, and into a second group of light sources 21 that are intended to deliver cargo-lamp light beams.

In the embodiment more particularly illustrated in FIG. 2, particularly advantageously but nonlimitingly, the light sources 20 of the first group of light sources are placed, in the common casing 1, in a position that is substantially central in the transverse direction Y of the lighting device 100, and the light sources 21 of the second group of light sources are distributed between a first subgroup of light sources 21a and a second subgroup of light sources 21b, which are placed on either side, in the transverse direction Y of the lighting device 100, of the first group of light sources 20. Thus, in the lighting device 100 more particularly illustrated in FIG. 2 the first group of light sources comprises six light sources 20 and the second group of light sources comprises four light sources 21: two light sources 21a allocated to the first subgroup and two light sources 21b allocated to the second subgroup.

The lighting device 100 also comprises a set of collimators 40, 41 each of which is configured to convert each beam output by one of the light sources 20, 21, into a parallel beam. The set of collimators of the lighting device 100 therefore comprises as many collimators 40, 41 as the common electronic holder 3 holds light sources 20, 21. Each collimator 40, 41 is therefore arranged facing one light source 20, 21, in such a way that the light beam emitted by the light source in question is substantially in its entirety conveyed through the corresponding collimator 40, 41. In the various embodiments of the invention, first collimators 40, which are configured to collimate the light beams emitted by the light sources 20 of the first group of light sources, and second collimators 41, which are configured to collimate the light beams emitted by the light sources 21 of the second group of light sources, are substantially identical or differ depending on the group to which the light source 20, 21 with which they are associated belongs.

Advantageously, the parallel beams output by the collimators 40, 41 are substantially parallel to one another. Below, the longitudinal direction X of the lighting device 100 will refer to the direction of the parallel beams output by each collimator 40, 41. In other words, the longitudinal direction X of the lighting device according to the invention is the main direction of propagation of each light beam output by a light source 20, 21.

With reference to these longitudinal and transverse directions X, Y of the lighting device, a vertical direction Z of the lighting device according to the invention is defined as being the direction perpendicular to the aforementioned longitudinal direction X and to the aforementioned transverse direction Y and that forms, with the latter, an orthonormal coordinate system (X, Y, Z) that, depending on the inclination of the road over the which the vehicle is being driven, may be coincident with or inclined with respect to the coordinate system (L, V, T) defined above.

The lighting device 100 according to the invention also comprises a common lens 5 that extends substantially parallel, to within assembly tolerances, to the common electronic holder 3 that bears the light sources 20, 21. The common lens 5 therefore extends in a main direction of elongation that is substantially parallel, to within assembly and manufacturing tolerances, to the transverse direction Y of the lighting device 100. In the longitudinal direction X of the lighting device 100 according to the invention, the common lens 5 is placed in such a way that all of the collimators 40, 41 are located between the common lens 5 and the common electronic holder 3.

A light beam emitted by a light source 20, 21 therefore firstly passes through the collimator 40, 41 located facing the light source 20, 21 in question, then passes through a portion of the common lens 5. An elementary optical unit 60, 61 that comprises the light source 20, 21 in question, a corresponding collimator 40, 41 that is passed through by the beam emitted by this light source, and the portion of the common lens 5 that is passed through by the parallel beam output by the collimator 40, 41 in question, is thus defined for each of the light sources 20, 21.

The function of the common lens 5 is to form the light beams intended for the various lighting functions of the lighting device 100. More precisely, according to the invention, the common lens 5 comprises at least one first region 50, which is configured to form a least one stop-lamp light beam, and a second region 51, which is configured to form at least one cargo-lamp light beam. In other words, the first region 50 of the common lens 5 is configured to form, from the beams output by each of the light sources 20 of the first group of light sources and formed by the first collimators 40, at least one light beam meeting the optical requirements of the stop lamps, and the second region 51 of the common lens 5 is configured to form, from the beams output by each of the light sources 21 of the second group of light sources and formed by the second collimators 41, at least one light beam meeting the optical requirements of the cargo lamps.

In the embodiment more particularly illustrated in FIG. 2, nonlimitingly, the first region 50 of the common lens 5 lies in a position that is substantially central, in the transverse direction Y of the lighting device 100 and of the common casing 1, and the second region 51 of the common lens 5 comprises a first portion 51a and a second portion 51b that are respectively located on either side, in the transverse direction Y of the lighting device 100, of the first region 50 of the common lens 5.

The lighting device 100 according to the invention therefore comprises, on the one hand, a first set of elementary optical units 60 each formed from a light source 20 of the first group of light sources, from a collimator 40, and from the portion of the first region 50 of the common lens 5 passed through by the collimated light beam output by the collimator 40 in question, and, on the other hand, a second set of elementary optical units 61 each formed from a light source 21 of the second group of light sources, from a collimator 41, and from the portion of the second region 51 of the common lens 5 passed through by the collimated light beam output by the collimator 41 in question. As FIG. 2 shows, the elementary optical units 60, 61 are arranged side-by-side, within the common casing 1 of the lighting device 100 according to the invention, in the transverse direction Y of the lighting device 100, and these elementary optical units 60, 61, have, in common, on the one hand, the common electronic holder 3 that holds all the light sources 20, 21, whatever the elementary optical unit 60, 61 to which they belong, and, on the other hand, the lens 5, which is common to all the elementary optical units 60, 61, whatever the lighting function associated with these elementary units.

FIG. 3 illustrates close-up in perspective a detail of the lighting device 100 according to the invention. More precisely, FIG. 3 shows a first elementary optical unit 60 comprising a light source 20 of the first group of light sources, a collimator 40 and one portion of the first region 50 of the common lens 5, and a second elementary optical unit 61 comprising a light source 21 of the second group of light sources, a collimator 41 and one portion of the second region 51 of the common lens 5. Moreover, the cavity 10 of the common casing 1 and the common electronic holder 3 that extends, in the cavity, mainly in the transverse direction Y of the lighting device 100 according to the invention also feature in FIG. 3.

It should firstly be noted that, according to this embodiment, which is nonlimiting, and more particularly illustrated in FIG. 3, the first collimator 40 associated with the light source 20 of the first elementary optical unit 60 and the second collimator 41 associated with the light source 21 of the second elementary optical unit 61 have, in cross section in a plane substantially parallel to the XY plane defined by the longitudinal direction X and by the transverse direction Y of the lighting device 100, different shapes.

The common lens 5 has an internal surface 52 that is located facing, in the longitudinal direction X, the common electronic holder 3 and light sources 20, 21 borne thereby, and that comprises a set of complex shapes 53 that are arranged side-by-side one another in the transverse direction Y of the lighting device. More precisely, as FIG. 3 shows, the complex shapes 53 extend so as to protrude, in the longitudinal direction X of the lighting device 100, from the internal surface 52 of the common lens 5, toward the common electronic holder 3.

Even more precisely, in this embodiment, which is non-limiting, and illustrated in FIG. 3, each complex shape 53 is a prismatic shape of triangular base formed, on the one hand, by the internal surface 52 of the common lens 5 and, on the other hand, by a first lateral face 532 and by a second lateral face 533, these lateral faces 532, 533, being connected to each other by an apex ridge 535 that extends, as FIG. 3 shows, substantially in the vertical direction Z of the lighting device 100. As a result of the above, the apex ridges 535 of the prismatic shapes 53 extend, in the longitudinal direction X of the lighting device 100, between the collimators 40, 41 and the common lens 5. In other words, the lateral faces 532, 533 of the prismatic shapes 53 are directed, in the aforementioned longitudinal direction X, toward the common electronic holder 3 and the light sources 20, 21 borne thereby.

In the nonlimiting embodiment more particularly illustrated in FIG. 3, certain of the lateral faces 532, 533, of the prismatic shapes 53 are substantially parallel to a vertical longitudinal XZ plane defined by the longitudinal direction X and by the vertical direction Z of the lighting device 100. More precisely, for each prismatic shape 53, the lateral face 532, 533 located on the side, in the transverse direction Y, of the optical axis 600, 610, of each of the elementary optical units, is substantially parallel to the aforementioned XZ plane. In other words, on a first side, in the transverse direction Y, of the optical axis 600, 610, of an elementary optical unit, 60, 61, respectively, it is the first lateral face 532 of the prismatic shapes 53 that is substantially parallel to the aforementioned XZ plane, and, on the opposite side, in the transverse direction Y, of the optical axis 600, 610, of the elementary optical unit, 60, 61, respectively, in question, it is the second lateral face 533 of the prismatic shapes 53 that is substantially parallel to the XZ plane.

Moreover, the inclination, with respect to the aforementioned XZ plane, of the lateral face 532, 533 that is not parallel to the aforementioned XZ plane, of each of the prismatic shapes 53, varies as a function of the position, in the aforementioned transverse direction Y, of the prismatic shape 53 in question with respect to the optical axis 600, 610 defined above.

Furthermore, as FIG. 3 shows, the dimensions in the longitudinal direction X of the prismatic shapes 53 arranged in the internal surface 52 of the common lens 5, on the one hand, are minimal on the optical axis 600, 610 of each elementary optical unit and, on the other hand, for each elementary optical unit, increase with distance from the corresponding optical axis in the transverse direction Y of the lighting device 100.

Such a configuration is that of the type of lens known as a Fresnel lens. In other words, for each elementary optical unit 60, 61, the prismatic shapes 53 arranged in the internal surface of the common lens 5 form an elementary Fresnel lens of the optical unit 60, 61 in question. The common lens 5 consists therefore, on the side of its internal surface 52, of a Fresnel system composed of all of the elementary Fresnel lenses formed by the prismatic shapes 53 of each elementary optical unit 60, 61.

It will be noted that, according to the embodiment more particularly illustrated in FIG. 3, the dimensions, in the longitudinal direction X, of the prismatic shapes 53 of the first optical unit 60, i.e. the shapes located in the first region 50 of the common lens 5, are larger than the dimensions, in the aforementioned longitudinal direction X, of the prismatic shapes 53 of the second optical unit 61, i.e. the shapes located in the second region 51 of the common lens 5. This participates in the generation, at the internal surface of the common lens, of greater transverse scatter of the rays emitted by this first optical unit 60 than of those emitted by the second optical unit.

These specific geometric configurations, of the elementary Fresnel lenses located in the first region 50 of the common lens 5 and of the elementary Fresnel lenses located in the second region 51 of the common lens 5, respectively, allow light beams having different optical characteristics, in particular in terms of form and orientation, to be obtained. More precisely, the elementary Fresnel lenses of the first optical units 60, corresponding to the light sources 20 of the first group of light sources, are configured to form, for each of these first optical units 60, an elementary light beam meeting the requirements of the light beams intended for the stop lamps, and the elementary Fresnel lenses of the second optical units 61, corresponding to the light sources 21 of the second group of light sources, are configured to form, for each of these second optical units 61, an elementary light beam meeting the requirements of the light beams intended for the cargo lamps.

It will also be noted that, according to the embodiment more particularly illustrated in the figures, the first optical unit 60 and the second optical unit 61 are separated, in the transverse direction Y of the lighting device, by a set 70 of ribs and elements for holding and increasing the rigidity of the common casing 1, which will be described in more detail below and which in particular allow a screen preventing leakage of light from one optical unit to the next to be formed.

FIGS. 4 and 5 show close-up schematic views of the external surface 54 of the common lens 5, i.e. the surface of the common lens that is opposite, in the longitudinal direction X of the lighting device 100, to the internal surface 52, FIGS. 4 and 5 illustrating this external surface 54 in the first region 50 and in the second region 51 of the common lens 5, respectively, i.e. respectively in the region of the common lens 5 intended for the stop lamps and in the region of the common lens 5 intended for the cargo lamps.

FIGS. 4 and 5 more particularly illustrate a feature of the invention whereby the external surface 54 of the common lens 5 comprises a first set of diffracting optical elements 55 in the first region 50, which elements are configured to orient at least one light beam of the stop lamps, and a second set of diffracting optical elements 56 in the second region 51, which elements are configured to orient at least one light beam of the cargo lamps.

More precisely, with reference to FIG. 4, the external surface 54 of the common lens 5 comprises a first set of diffracting optical elements the prismatic shapes 55 of which each comprise a first apex ridge 550 that extends substantially in the transverse direction Y of the lighting device 100, substantially over the entirety of the transverse dimension of the external surface of the first region 50 of the common lens 5. More precisely, these prismatic shapes 55 are arranged side-by-side, in the vertical direction Z of the lighting device 100, substantially over the entirety of the dimension, in this vertical direction Z, of the external surface 54 of the first region 50 of the common lens 5. As a result of their configuration, these prismatic shapes 55 cause a deviation, in the vertical direction Z of the lighting device 100, of a light beam passing through the first region 51 of the common lens 5.

In the nonlimiting embodiment more particularly illustrated in FIG. 4, each prismatic shape 55 of the first set of diffracting optical elements that is arranged in the external surface 54 of the common lens 5 has a triangular base substantially parallel to a vertical longitudinal XZ plane of the lighting device 100, and extends so as to protrude from the external surface 54, in the longitudinal direction X of the lighting device 100, away from the common electronic holder 3. According to alternative embodiments, each prismatic shape 55 of the first set of diffracting optical elements that is arranged in the external surface 54 of the common lens 5 may be a groove arranged transversely in the thickness, in the longitudinal direction X, of the common lens 5. It is also entirely possible to envisage any combination of prismatic shapes 55 arranged protruding from the external surface 54 of the common lens 5 and arranged recessed into the thickness of this common lens, as the invention will not be affected thereby provided that the sought-after result, namely the deviation of a light beam in the vertical direction Z of the lighting device 100, is achieved.

More particularly, and such as will be detailed below, the diffracting optical elements produced in the first region 50 corresponding to the stop lamps are configured to vertically rectify the beam passing through the common lens 5, i.e. direct the rays vertically upward, away from the ground over which the vehicle is driven.

With reference to FIG. 5, the external surface 54 of the common lens 5 comprises a second set of diffracting optical elements the prismatic shapes 56 of which each comprise a second apex ridge 560 that extends substantially in the vertical direction Z of the lighting device 100, substantially over the entirety of the vertical dimension of the external surface 54 of the second region 51 of the common lens 5. As FIG. 5 shows, these prismatic shapes 56 are arranged side-by-side, in the transverse direction Y of the lighting device 100, substantially over the entirety of the dimension, in this transverse direction Y, of the external surface of the second region 51 of the common lens 5. As a result of their configuration, these prismatic shapes 56 cause a deviation, in the transverse direction Y of the lighting device 100, of a light beam passing through the second region 51 of the common lens 5.

In the nonlimiting embodiment more particularly illustrated in FIG. 5, each prismatic shape 56 of the second set of diffracting elements that is arranged in the external surface 54 of the common lens 5 has a triangular base substantially parallel to a transverse longitudinal XY plane of the lighting device, and extends so as to protrude from the external surface 54, in the longitudinal direction X of the lighting device 100, away from the common electronic holder 3. Alternatively, each prismatic shape 56 of the second set of diffracting optical elements that is arranged in the external surface 54 of the common lens 5 may be a groove arranged vertically in the thickness, in the longitudinal direction X, of the common lens 5. It is also entirely possible to envisage any combination of prismatic shapes 56 arranged protruding from the external surface 54 of the common lens 5 and arranged recessed into the thickness of this common lens, as the invention will not be affected thereby provided that the sought-after result, namely the deviation of a light beam in the transverse direction Y of the lighting device 100, is achieved.

As a result of the above, each elementary light beam intended for the stop lamps, i.e. output by an elementary optical unit 60 the light source 20 of which belongs to the first group of light sources, and the elementary Fresnel lens of which is arranged in the first region 50 of the common lens 5, after having been configured depending on the optical requirements of the light beams intended for the stop lamps by the elementary Fresnel lens of the elementary optical unit 60 in question, is deviated, by the prismatic shapes 55 of the first group of diffracting optical elements, in the vertical direction Z of the lighting device 100.

Similarly, each elementary light beam intended for the cargo lamps, i.e. output by an elementary optical unit 61 the light source 21 of which belongs to the second group of light sources, and the elementary Fresnel lens of which is arranged in the second region 51 of the common lens 5, after having been configured depending on the optical requirements of the light beams intended for the cargo lamps by the elementary Fresnel lens of the elementary optical unit 61 in question, is deviated, by the prismatic shapes 56 of the second group of diffracting elements, in the transverse direction Y of the lighting device 100.

Thus, after passage through the common lens 5, a set of light beams certain of which meet the requirements of the stop lamps and certain of which meet the requirements of the cargo lamps is obtained, thus combining these two functions by means of the single common lens 5 and a single common electronic holder 3.

FIGS. 6 and 7 are cross-sectional views, in a plane substantially parallel to a vertical longitudinal XZ plane, of a lighting device 100 such as just described above. FIG. 6 is a cross-sectional view of the common casing 1 in a plane parallel to the aforementioned XZ plane and containing the optical axis 600 of an elementary optical unit 60 located in the first region 50 of the common lens 5, and FIG. 7 is a cross-sectional view of the common casing 1 in a plane parallel to the aforementioned XZ plane and containing the optical axis 610 of an elementary optical unit 61 located in the second region 51 of the common lens 5.

FIG. 6 features, respectively, a light source 20 of the first group of light sources, which light source is placed on the common electronic holder 3, a collimator 40 that is associated with the aforementioned light source 20, and the prismatic shapes 53 that were described above. Likewise, FIG. 7 features, respectively, a light source 21 of the second group of light sources, which light source is placed on the common electronic holder 3, a collimator 41 that is associated with the light source 21, and the prismatic shapes 53 that were described above.

FIGS. 6 and 7 clearly show the relative configurations of the common electronic holder 3 and of the common lens 5, which are parallel to each other to within manufacturing and assembly tolerances.

Moreover, FIGS. 6 and 7 show a projecting lens 9 arranged, substantially in the longitudinal direction X of the lighting device 100, in front of the common lens 5. In other words, the common lens 5 is located, in the aforementioned longitudinal direction X, between the common electronic holder 3 and the projecting lens 9. According to the invention, the function of the projecting lens 9 is to increase the uniformity of the light beams output by the elementary optical units 60, 61, which were described above, in order to form, respectively, a first lighting area 90 intended for the stop lamps, and a second lighting area 91 intended for the cargo lamps.

To this end, the internal surface 92 of the projecting lens, located, in the longitudinal direction X of the lighting device 100, on the side of the common lens 5 and of the common electronic holder 3, comprises a plurality of light-scattering elements. The light-scattering elements are defined in such a way that they allow, on the one hand, the elementary light beams output by the light sources 20 of the first group of light sources to be merged into a first lighting area 90 that is intended for the stop lamps, and, on the other hand, the elementary light beams output by the light sources 21 of the second group of light sources to be merged into a second lighting area 91 that is intended for the cargo lamps.

In the nonlimiting embodiment more particularly illustrated in FIG. 6, in the region of the lighting device 100 more particularly intended for the stop lamps, the light-scattering elements arranged on the internal surface 92 of the projecting lens take the form of beads 93 that extend so as to protrude, in the longitudinal direction X of the lighting device, toward the external surface 54 of the common lens 5. More precisely, the beads 93 each have a substantially curved shape the apex of the curve of which is directed toward the common lens 5, and they are arranged side-by-side in series substantially in the vertical direction V of the motor vehicle. Even more precisely, as more particularly shown in FIG. 6, the beads 93 are arranged in a region 920 of the internal surface 92 of the projecting lens 9 located facing the external surface 54 of the common lens 5. The region 920 of the internal surface 92 of the projecting lens 9 on which the aforementioned beads 93 are arranged may in particular be limited by the projections, in a longitudinal direction of the vehicle or of the lighting device, of the edges, here the vertical edges 540, 541, of the external surface 54 of the common lens 5.

In the embodiment more particularly illustrated in FIGS. 6 and 7, the region 920 of the internal surface 92 of the projecting lens 9 is inclined with respect to the external surface 54 of the common lens 5. This results in a dispersion of the elementary light beams output by the light sources 20 of the first group of light sources, which dispersion is accentuated by the presence of the beads 93. More precisely, the relative inclination of the region 920 of the internal surface 92 of the projecting lens 9 is opposed to the relative inclination of the external surface 54 of the common lens 5 with respect to the vertical axis V of the vehicle.

In the nonlimiting embodiment more particularly illustrated in FIG. 7, in the region of the lighting device 100 more particularly intended for the cargo lamps, the light-scattering elements arranged on the internal surface of the projecting lens are organized into a first set of scattering elements 93, which are advantageously substantially similar and arranged substantially similarly to the beads 93 described above, and into a second set of scattering elements 94. As FIG. 7 more particularly shows, the scattering elements 94 of the second set of scattering elements substantially take the form of prisms an apex ridge 940 of which extends substantially in the transverse direction Y of the lighting device 100, the scattering elements 94 being arranged side-by-side, in the vertical direction Z of the lighting device 100, and protruding from a second region 921 of the internal surface 92 of the projecting lens 9. In other words, the apex ridges 940 of the scattering elements 94 of the second group of light-scattering elements are directed toward the interior of the cavity 10 of the common casing 1.

More precisely, as FIG. 7 shows, the projecting lens 9 forms, in cross section in a plane substantially parallel to the vertical longitudinal XZ plane, an L shape the intersection of the arms of which is located substantially, in the longitudinal direction X of the lighting device 100 according to the invention, in the extension of a lower edge 541 of the external surface 54 of the common lens 5. The region 920 of the internal surface 92 on which the beads 93 are arranged corresponding to one of the arms of the projecting lens, the scattering elements 94 of the second group of light-scattering elements are arranged in the region 921 of the internal surface 92 of the projecting lens 9 corresponding to the second arm of this projecting lens.

As was indicated above, the scope of the invention encompasses a vehicle 300 equipped with a lighting device 100 such as has just been described, with a common lens 5 and where appropriate an electronic holder 3 that is common to the various optical units. Such a vehicle 300 is schematically illustrated in FIG. 1. According to the invention, the lighting device 100, such as has just been described, is advantageously placed in the vehicle 300 in such a way that the vertical direction Z of the common lens 5 and of the common electronic holder 3 makes, with the vertical direction V of the vehicle, an angle 500 substantially comprised between 10 degrees and 45 degrees. This angle 500 is defined in such a way that a light beam emitted by one of the light sources 20, 21 described above is directed downward with respect to the longitudinal and transverse plane of the vehicle. It will be noted that in FIG. 1 the lighting device 100 is shown open in order to allow the common lens 5 thereof to be seen.

The combined configurations of the external surface 54 of the first region 50 of the common lens 5 and of the scattering elements 93 of the first group of light-scattering elements thus lead, with reference to the orientations defined above, to an upward deviation of the light beams intended for the stop lamps. In order to meet regulations, the resulting lighting area 90, which is configured to perform the stop-lamp function, is therefore indeed directed so as to be visible by vehicles far away from the vehicle 300 that is equipped with the lighting device 100 according to the invention.

Moreover, the combined configurations of the external surface 54 of the second region 51 of the common lens 5 and of the scattering elements 94 of the second group of light-scattering elements lead, with reference to the orientations defined above, to a downward deviation of the light beams intended for the cargo lamps. The resulting lighting area 91, which is configured to perform the cargo-lamp function, is therefore indeed directed so as to produce optimal lighting of the entirety of the volume of the rear exterior transporting zone 400.

The invention therefore achieves the aims that were set therefor, by providing a simple device combining stop lamps and cargo lamps and comprising a small number of components and in particular optical components.

FIG. 8 shows a schematic perspective view of a detail of the assembly of the lighting device 100 according to the invention. This figure shows, in particular, an elementary optical unit formed from a plurality of light sources 20, from first collimators 40 and from the set of prismatic shapes 53 forming the elementary Fresnel lens of the corresponding optical unit. In this figure the common electronic holder 3 on which the light sources 20 are placed may also be seen.

With reference to FIG. 8, the common lens 5 is advantageously accommodated in a frame 7 a first portion 71 of which forms a housing for accommodating the common lens 5 and a second portion 72 of which receives the collimators 40, 41 that were described above. Between its first portion 71 and its second portion 72, the frame 7 comprises a plurality of rigidifying elements each of which extends in a direction substantially parallel to the longitudinal direction X of the lighting device 100.

The set 70 of ribs and of rigidifying elements described above comprises substantially planar ribs 73 that extend in planes that are substantially parallel to the vertical longitudinal XZ plane described above, and shapes 74 a first portion 740 of which extends in a plane substantially parallel to a transverse longitudinal XY plane defined by the longitudinal direction X and by the transverse direction Y of the lighting device 100, and a second portion 741 of which substantially takes the form of a segment of cylinder the axis of which extends in the vertical direction Z of the lighting device 100. More precisely, the aforementioned second portion 741 is oriented in such a way that the apex of its curvature is directed in the longitudinal direction X of the lighting device 100 toward the common lens 5. Even more precisely, the first portion 740 and the second portion 741 of any one aforementioned shape 74 are attached together via the apex of the curvature of the second portion 741. In other words, the first portion 740 of the shape 74 extends in a substantially radial direction from the segment of cylinder formed by the second portion 741 of the same shape 74, between the first portion 71 of the frame 7 and an external surface of the aforementioned second portion 741, which is located, in the longitudinal direction X of the lighting device 100, on the side of the common lens 5.

The ribs 73 allow both the frame 7 to be fastened in the casing of the device, via an interaction of fastening hooks 8 that are securely fastened to the casing with an edge delineating these ribs, and the leakage of light from one optical unit to the next to be blocked.

With reference to FIG. 8, the internal surface of the second portion 741 of the aforementioned shapes 74, which surface is oriented, in the longitudinal direction X, toward the common electronic holder 3, comprises a snap-fastening finger 75 the main direction of extension of which is substantially parallel to the longitudinal direction X of the lighting device 100. More precisely, the snap-fastening finger 75 extends, toward the common electronic holder 3, substantially in the same direction as the first portion 740 of the shape 74. Advantageously, a plurality of shapes 74 such as the aforementioned and a plurality of snap-fastening fingers 75 are distributed transversely over the frame 7.

As FIG. 8 shows, the invention makes provision for the common electronic holder 3 to comprise a set of orifices 30 each of which is arranged to receive one snap-fastening finger 75. More precisely, the shapes and dimensions of each finger 75 are defined in such a way that each of these fingers, in the lighting device 100, is engaged in an orifice 30 such as the aforementioned, and locked by snap fastening against one of the edges of this orifice.

The locking by snap fastening of each finger 75 in an orifice 30 thus achieves the assembly, via the frame 7, of the common electronic holder 3 and, on the one hand, the collimators 40, 41, and, on the other hand, the common lens 5. In other words, the locking by snap fastening of each finger 75 in one orifice 30 of the common electronic holder 3 achieves the assembly of each elementary optical unit 60, 61 such as described above.

The subassembly thus preassembled may be inserted and locked in the common casing 1, for example by engaging hooks 8 arranged in this casing 1 with an edge of a rigidifying rib 73 arranged, between the first portion 71 and the second portion 72 of the frame 7, in a plane that is substantially parallel to the vertical longitudinal XZ plane defined above.

The common casing 1 thus comprises hooks 8 that are arranged to fasten the frame 7 and it comprises, such as may be seen in FIGS. 3 and 8 for example, partitions 80 that extend parallel to the rigidifying ribs 73 borne by the frame. The partitions 80 act on the one hand to centre the frame 7, and therefore the common lens 5, longitudinally with respect to the common electronic holder 3, and they on the other hand act to block the leakage of light from one optical unit to the next. To this end, the partitions 80 extend vertically, in the vertical direction Z of the lighting device, over a height substantially equal to that of the frame 7, in order to ensure that rays leaking transversely from a Fresnel lens are blocked by these partitions.

The invention therefore allows the optical elements of the lighting device 100 to be preassembled, thus decreasing the number of operations required to assemble this lighting device and the cost of these assembly operations. The invention therefore indeed achieves another of the aims that were set therefore: the production of a simple device, of low cost, of an assembly combining stop lamps and cargo lamps. Advantageously, in addition, the common casing 1, the common electronic holder 3, the frame 7 and the common lens 5, in particular, may be produced by injection moulding plastics in moulds, allowing the lighting device 100 according to the invention to be mass produced.

The invention such as it has just been described is not however limited to the means and configurations exclusively described and illustrated, and also applies to any equivalent means or configurations and to any combination of such means or configurations. In particular, although the invention has been described in a configuration in which the stop lamps are arranged in a substantially central position, in the transverse direction Y, of the lighting device 100, the cargo lamps being distributed on either side of the stop lamps in this transverse direction Y, the invention is applicable in particular to any other relative configuration of the stop lamps and of the cargo lamps within the lighting device 100: for example, stop lamps and cargo lamps may be arranged one above the other in the vertical direction Z of the lighting device 100, without affecting the invention. Likewise, it is entirely envisageable, without affecting the invention, for the common lens 5 to, for example, be made up of one or more parts.

The invention claimed is:

1. A lighting device for a motor vehicle, the lighting device comprising:
    a common lens extending in a transverse direction of the lighting device and having an external surface along the transverse direction that includes
        a first set of diffracting optical elements in a first region and a second set of diffracting optical elements in a second region;
    a vehicle stop-lamp assembly; and
    a cargo-lamp assembly, wherein
    the first set of diffracting optical elements orient at least one stop-lamp light beam and the second set of diffracting optical elements orient at least one cargo-lamp light beam, the at least one stop-lamp light beam and the at least one cargo-lamp light beam being formed by the common lens based on an actuation of at least one of the vehicle stop-lamp assembly and the cargo-lamp assembly, and
    each diffracting optical element of the first set of diffracting optical elements extends in a first direction and each diffracting optical element of the second set of diffracting optical elements extends in a different, second direction.

2. The lighting device according to claim 1, wherein an internal surface of the common lens comprises a set of complex shapes that form, in the first region of the common lens, the at least one stop-lamp light beam and, in the second region of the common lens, the at least one cargo-lamp light beam.

3. The lighting device according to claim 2, further comprising
    a first group of light sources that emit stop-lamp light beams, and
    a second group of light sources that emit cargo-lamp light beams, the light sources of the first group and the light sources of the second group being arranged on a common electronic holder.

4. The lighting device according to claim 2, further comprising
    at least one projecting lens having an internal surface that includes a set of light-scattering elements.

5. A motor vehicle equipped with the lighting device according to claim 2, wherein a vertical direction of the motor vehicle makes, with a vertical direction of the lighting device, an angle substantially between 10 and 45 degrees.

6. The lighting device according to claim 1, wherein each diffracting optical element of the first set of diffracting optical elements
    extends substantially parallel to the transverse direction of the lighting device, and
    deviates one or more light beams coming from the first region of the common lens in a vertical direction of the lighting device.

7. The lighting device according to claim 6, wherein each diffracting optical element of the second set of diffracting optical elements
    extends substantially parallel to the vertical direction of the lighting device, and
    deviates one or more light beams coming from the second region of the common lens in the transverse direction of the lighting device.

8. The lighting device according to claim 6, wherein the lighting device comprises
    a first group of light sources that emit stop-lamp light beams, and
    a second group of light sources that emit cargo-lamp light beams, the light sources of the first group and the light sources of the second group being arranged on a common electronic holder.

9. The lighting device according to claim 6, further comprising
    at least one projecting lens having an internal surface that includes a set of light-scattering elements.

10. The lighting device according to claim 1, wherein each diffracting optical element of the second set of diffracting optical elements
    extends substantially parallel to a vertical direction of the lighting device, and
    deviates one or more light beams coming from the second region of the common lens in the transverse direction of the lighting device.

11. The lighting device according to claim 1, further comprising
    a first group of light sources that emit stop-lamp light beams, and
    a second group of light sources that emit cargo-lamp light beams, the light sources of the first group and of the second group being arranged on a common electronic holder.

12. The lighting device according to claim 11, wherein the common electronic holder is arranged substantially parallel to the common lens.

13. The lighting device according to claim 1, further comprising
- at least one projecting lens having an internal surface that includes a set of light-scattering elements.

14. A motor vehicle equipped with the lighting device according to claim 1, wherein a vertical direction of the motor vehicle makes, with a vertical direction of the lighting device, an angle substantially between 10 and 45 degrees.

15. The lighting device according to claim 1, wherein the first region of the common lens is centrally-located along the transverse extension of the common lens and the second region of the common lens is two subregions that are peripherally-located relative to the first region of the common lens and along the transverse extension of the common lens.

16. The lighting device according to claim 1, wherein prismatic shapes of the first set of diffracting optical elements in the first region of the common lens are perpendicular to prismatic shapes of the second set of diffracting optical elements in the second region of the common lens.

* * * * *